United States Patent [19]

Kihara

[11] 3,833,921

[45] Sept. 3, 1974

[54] MAGNETIC RECORDING AND/OR REPRODUCING APPARATUS WITH CASSETTE LOCKING TO PREVENT ACCIDENTAL REMOVAL

[75] Inventor: Nobutoshi Kihara, Tokyo, Japan

[73] Assignee: Sony Corporation, Tokyo, Japan

[22] Filed: Sept. 20, 1973

[21] Appl. No.: 399,049

[30] Foreign Application Priority Data

Sept. 21, 1972 Japan .............................. 47-109960

[52] U.S. Cl. .................................... 360/85, 274/4 E

[51] Int. Cl. ....................... G11b 15/66, G11b 23/04

[58] Field of Search ............ 179/100.2 ZA, 100.2 Z, 179/100.2 T, 100.2 MD; 274/4 D, 4 E

[56] References Cited

UNITED STATES PATENTS

| | | | |
|---|---|---|---|
| 3,665,114 | 5/1972 | Hathaway | 179/100.2 Z |
| 3,674,942 | 7/1972 | Sugaya | 179/100.2 ZA |
| 3,678,213 | 7/1973 | Sato | 179/100.2 ZA |
| 3,681,539 | 8/1972 | Eibensteiner | 179/100.2 T |
| 3,740,492 | 6/1973 | Inaga | 179/100.2 ZA |

*Primary Examiner*—Alfred H. Eddleman
*Attorney, Agent, or Firm*—Lewis H. Eslinger, Esq.; Alvin Sinderbrand, Esq.

[57] ABSTRACT

In a magnetic recording and/or reproducing apparatus having a tape guide drum, at least one rotary magnetic head moved in a circular path coinciding with the circumferntial surface of the drum for scanning a magnetic tape wrapped about at least a portion of that surface, a tape supply, such as, a cassette containing reels on which a magnetic tape is wound, a capstan spaced from the guide drum, and a holder for receiving and positioning the cassette at a location spaced from the guide drum; a tape loading and unloading device is provided which comprises a support ring rotatable around the drum between inactive and operative positions in an arcuate path that extends adjacent the capstan and the holder, a tape engaging assembly including a pinch roller mounted on the support ring and being movable with the latter in the aforementioned arcuate path for engaging the tape contained in the cassette positioned by the holder with the support ring in its inactive position and for withdrawing a progressively extended loop of tape from the cassette and wrapping one side of the extended tape loop about at least a portion of the guide drum circumference in response to movement of the support ring from the inactive to the operative position at which the pinch roller is located within the tape loop adjacent the capstan with the tape of the loop therebetween, and a tape shifting assembly controllable by a cam surface on the support ring for engaging the tape in the cassette with the support ring in its inactive position and for shifting the tape between the guide drum and cassette in the direction increasing the extent of the guide drum circumference about which the tape is wrapped in response to the movement of the support ring to its operative position. The cam surface on the support ring further controls a cassette locking assembly which prevents removal of a cassette from the holder when the support ring is displaced from its inactive position.

20 Claims, 12 Drawing Figures

MAGNETIC RECORDING AND/OR REPRODUCING APPARATUS WITH CASSETTE LOCKING TO PREVENT ACCIDENTAL REMOVAL

BACKGROUND OF THE INVENTION

1. Field of the Invention

This invention relates generally to magnetic recording and/or reproducing apparatus, such as, video tape recording and reproducing apparatus (VTR), and more particularly is directed to improvements in an automatic tape loading and unloading device for such apparatus.

2. Description of the Prior Art

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface of the drum and being driven by a cooperating capstan and pinch roller and by suitable rotation of the take-up reel. In preparing such a video tape recording and reproducing apparatus for operation, the tape extending between the supply and take-up reels, which are preferably contained in a cassette, must be placed around or wrapped about at least a portion of the drum circumference so that the tape will be guided thereby with respect to the rotary magnetic head assembly.

In order to avoid the obvious disadvantages of manually withdrawing the tape between the reels from the cassette and threading the tape about the guide drum and the various other guide members and between the pinch roller and capstan in preparation for a recording or reproducing operation, and of manually removing the tape from the guide drum and returning the tape to the cassette at the completion of such an operation, automatic tape loading and unloading devices have been proposed for performing the foregoing functions.

One type of previously proposed automatic tape loading and unloading device for a video signal recording and/or reproducing apparatus is disclosed in detail in U.S. Pat. No. 3,740,495, which has a common assignee herewith. In such automatic tape loading and unloading device, a rotatable support member, in the form of a ring, extends around the guide drum and carries a number of tape guides which define an arcuate guide path spaced from the drum, and a tape engaging member is also mounted on the rotatable support member and is movable with respect to the latter into and out of the arcuate guide path. In an inactive or starting condition of the device, the tape engaging member is displaced out of the guide path so as to engage the tape between the take-up and supply reels which may be contained in a cassette or cartridge, and the tape engaging member is moved into the guide path upon turning of the rotatable support member during a loading operation to draw a loop of the tape from one or both of the reels and to wrap one side of the loop about the guide drum while the tape guides move into the loop and engage the other side of the loop for maintaining such other side away from the surface of the guide drum. During the tape unloading operation of the device, the tape engaging member remains in the guide path during the major portion of its movement with the rotatable support member for unwrapping the tape from about the guide drum and, at the conclusion of the tape unloading operation, the tape engaging member is moved out of the guide path so as to permit the return or rewinding of the tape which constituted the loop on at least one of the reels.

Although the above described tape loading and unloading device as disclosed in the identified copending application is generally satisfactory, the relatively large number of tape guides on the rotatable support member make it difficult to stabilize the tape path during recording and reproducing operations. Such tape guides are in the form of pins which must be precisely shaped and oriented on the rotatable support member and thereby give rise to manufacturing difficulties. Further, the rotatable support member in the form of a ring does not extend under the cassette or cartridge and the tape engaging member projects outwardly from the ring in the inactive condition of the device for engaging the tape in the cassette or cartridge, so that the overall dimensions of the recording and/or reproducing apparatus are undesirably large. It is also to be noted that, as the tape loop is being formed, the relatively large number of tape guides or pins have to move into the tape loop from the outside of the latter and this is a fairly delicate operation which makes the tape loading and unloading device susceptibel to improper loading.

In another previously proposed automatic tape loading and unloading device disclosed in U.S. Pat. No. 3,740,492, also having a common assignee herewith, tape guides or pins and a pinch roller mounted on the support ring move into the tape loop from the outside of the latter as the tape loop is being formed, and, therefore, this device is susceptible to the problems indicated above. Further, the support ring again does not extend under the cassette positioned by the holder therefor so that the overall dimensions of the recording and/or reproducing apparatus are undesirably large.

In still another previously proposed automatic tape loading and unloading device, for example, as disclosed in detail in U.S. patent application Ser. No. 354,992, filed Apr. 27, 1973, and having a common assignee herewith, the support ring is turnable around the guide drum in an arcuate path that extends under the cassette when the latter is received and positioned by the holder therefor, a tape engaging assembly, which includes a pinch roller, is carried by the support ring and extends into an opening of the cassette for engagement with the tape therein when the ring is in an inactive or starting position, such tape engaging assembly drawing a loop of tape from the cassette and wrapping one side of the tape loop about the guide drum and between the pinch roller and a capstan upon turning of the ring to an operative position during a tape loading operation, and a tape guiding member is mounted on the support ring and is moved relative to the latter from an inner position, at which the tape guiding member also extends into the cassette opening with the support ring at its starting position so as to be disposed within the tape loop, to an outer position spaced outwardly from the support ring in response to movement of the latter to its operative position during a loading operation, so that the tape guidding member then holds the other side of the tape loop away from the guide drum. This tape loading and unloading device further includes a tape shifting member which also extends into the cassette opening when the support ring is in its starting or inactive position so as to be disposed within the tape loop, and such tape shifting member is moved, as the support ring nears its operative position, to displace the tape between the guide drum and the supply reel into engagement with an erasing head located near the guide drum. Thus, all elements which are to be disposed inside the tape loop at the completion of a tape loading operation, are disposed within the tape loop at the initiation of the tape loading operation so as to achieve complete reliability in such operation. Further, the overall dimensions of the magnetic recording and/or reproducing apparatus provided with the last-described tape loading and unloading device are relatively reduced.

However, with the last described tape loading and unloading device, difficulties are encountered in operating the tape shifting member so as to wrap the tape about a sufficient portion of the guide drum periphery and into engagement with the erasing head. Further, with all of the previously proposed devices, as described above, difficulty is encountered in maintaining a proper tension in the tape during recording or reproducing operations, as well as during tape loading and unloading operations. Furthermore, in recording and/or reproducing apparatus provided with automatic tape loading and unloading devices, as aforesaid, no provision is made fro preventing accidental removal of a cassette from the holder at a time when the tape is engaged with the guide drum.

SUMMARY OF THE INVENTION

Accordingly, it is an object of this invention to provide a magnetic recording and/or reproducing apparatus of the described type with an automatic tape loading and unloading device which avoids all of the abovementioned deficiencies of the existing devices.

More specifically, it is an object of this invention to provide a magnetic recording and/or reproducing apparatus with an automatic tape loading and unloading device and in which a locking assembly prevents accidental removal of a cassette from the holder therefor so long as the tape is withdrawn from the cassette and wrapped about the guide drum.

Another object is to provide an automatic tape loading and unloading device which is relatively simple in construction and operation, and also relatively compact so as to minimize the space required for such device, and further in which such device includes an improved tape shifting assembly by which an adequate wrapping of the tape about the guide drum and proper engagement of the tape with an erasing head are reliably and conveniently obtained.

Still another object is to provide a tape loading and unloading device with a cassette locking assembly and a tape shifting assembly, as aforesaid, and in which such assemblies are conveniently operated by cam surfaces formed on the support ring.

A further object is to provide a magnetic recording and/or reproducing apparatus with an automatic tape loading and unloading device, as aforesaid, and in which a proper tension is maintained in the tape withdrawn from the cassette during tape loading and unloading operations and during recording and reproducing operations.

In accordance with an aspect of this invention, a tape loading and unloading device of the type having a support ring rotatable around the guide drum between inactive and operative positions in an arcuate path that extends adjacent a capstan and a holder for a cassette, and a tape engaging assembly including a pinch roller mounted on the support ring for engaging the tape in the cassette in the inactive position of the support ring and for withdrawing a tape loop and wrapping one side of the tape loop about at least a portion of the guide drum periphery when the support ring is moved to its operative position at which the pinch roller is located within the tape loop adjacent the capstan, is provided with a cam surface on the support ring which controls a tape shifting assembly engageable with the tape in the cassette when the support ring is in its inactive position and shifting the tape path between the guide drum and cassette to increase the extent of the guide drum periphery about which the tape is wrapped when the support ring is moved to its operative position.

In accordance with another feature of the invention, the cam surface on the rotatable support ring controls a cassette locking assembly which prevents removal of a cassette from the holder therefor except when the support ring is in its inactive position.

The above, and other objects, features and advantages of this invention, will be apparent from the following detailed description of illustrative embodiments thereof which is to be read in connection withthe accompanying drawings.

DESCRIPTION OF THE PREFERRED EMBODIMENTS

Figure 1:
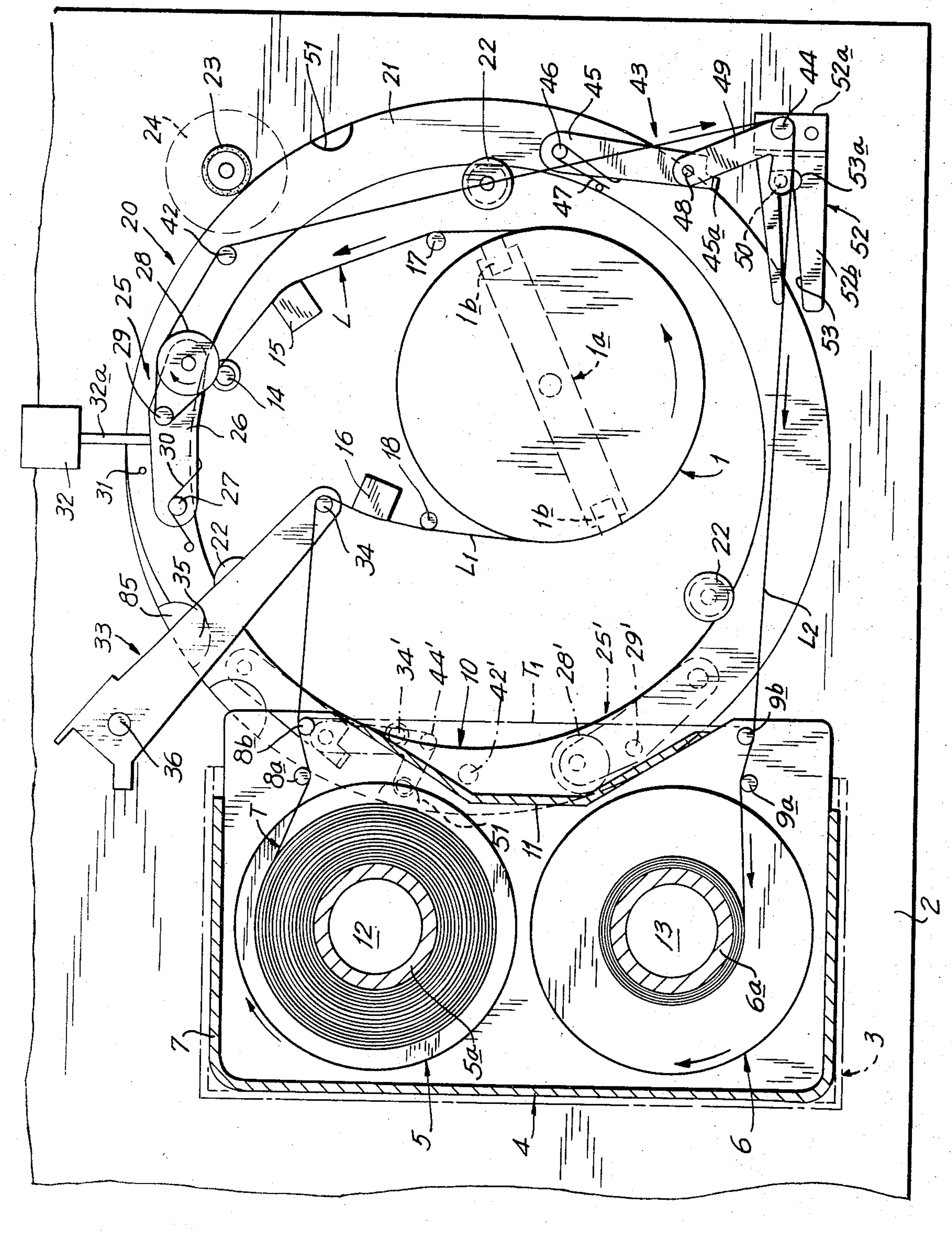
FIG. 1 is a schematic top plan view of a magnetic recording and/or reproducing apparatus provided with a tape loading and unloading device of the type to which the present invention is applied.

Referring to the drawings in detail, and initially to FIG. 1 thereof, it will be seen that a magnetic recording and/or reproducing apparatus to which this invention is applied is of the type disclosed in detail in U.S. patent application Ser. No. 354,992, filed Apr. 27, 1973, and comprises a cylindrical tape guide drum 1 mounted on a chassis 2 and having a circumferential slot or gap (not shown), and a rotary magnetic head assembly 1*a* (appearing in broken lines) rotatably mounted in drum 1 and including one or more magnetic heads 1*b* which are moved along the slot or gap, that is, in a circular path substantially coinciding with the peripheral surface of drum 1.

A cassette holding device, shown schematically in borken lines and indicated generally by the reference numeral 3, is suitably mounted on a chassis 2 in front of guide drum 1k and, as hereinafter described in detail, is movable between a raised position, in which holding device 3 is adapted to receive a tape cassette 4, and a lowered or operative position, in which the cassette is positioned for a recording or reproducing operation. The tape cassette 4 is shown to include a supply reel 5 and a take-up reel 6 rotatably contained within a housing 7 and having a magnetic tape T wound thereon. The tape T extending between reels 5 and 6 is guided about guide pins 8*a* and 8*b* adjacent reel 5 and about guide pins 9*a* and 9*b* adjacent reel 6 so as to normally follow a path including a run, indicated in broken lines at $T_1$, between guide pins 8*b* and 9*b* at which the tape is exposed through an opening 10. The opening 10 extends along the side and bottom portion of housing 7 which is directed toward guide drum 1 when cassette 4 is received by holding device 3. Access to the interior of cassette housing 7 through opening 10 is limited by a partition 11 which extends along the edge of opening 10 in the bottom wall of housing 7 from near guide pin 8*b* to near guide pin 9*b*, and which is spaced inwardly from the run $T_1$ of the tape.

Reel support shafts 12 and 13 extend upwardly from chassis 2 and are respectively engageable by the hubs 5*a* and 6*a* of supply reel 5 and takeup reel 6 when holding device 3 is lowered to its operative position with the cassette 4 received therein. Suitable drive assemblies (not shown) may be provided for driving takeup reel support shaft 13 in the direction winding the tape T on takeup reel 6 during recording, resproducing and fast-forward operations of the apparatus, and for driving supply reel support shaft 12 in the direction for rewinding the tape on supply reel 5 during rewinding operation of the apparatus.

The recording and/or reproducing apparatus is further shown to include a capstan 14 which is suitably driven from a drive motor (not shown), a fixed magnetic head assembly 15 for recording and/or reproducing audio and control signals, an erasing head 16 and tape guides 17 and 18, all of which are mounted on chassis 2 at predetermined spaced apart positions, as shown. In order to operate the magnetic recording and/or reproducing apparatus, it is necessary to load the tape from cassette 4 on holding device 3 about at least a portion of the circumferential surface of guide drum 1 for scanning by the rotary magnetic head assembly 1*a* assocaited with the guide drum, and further to engage the magnetic tape with capstan 14 so that the latter will drive the tape and also with the fixed magnetic heads 15 and 16. When it is desired to remove the cassette 4 from the apparatus at the conclusion of a recording or reproducing operation, it is necessary to unload the tape from about drum 1 and to return the tape to the cassette 4.

In the illustrated apparatus, a device 20 for performing the above described tape loading and unloading functions generally includes a support member 21 which is preferably in the form of a ring, as shown, and which is rotatable about guide drum 1 in a circular or arcuate path that extends under the opening 10 of a cassette 4 positioned by the holding device 3. The support ring 21 may be disposed eccentrically with respect to guide drum 1, to provide a relatively large space therebetween for accommodating capstan 14, heads 15 and 16 and tape guides 17 and 18. Support ring 21 is shown to be rotatably supported by grooved rollers 22 which engage the inner periphery of ring 21 and which are suitably mounted above chassis 2. In order to effect turning of support ring 21 about guide drum 1, the outer periphery of ring 21 is frictionally engaged by a drive roller 23 which is rotatable by a suitable reversible electric motor 24.

Mounted on support ring 21 is a tape engaging assembly 25 which is shown to include a support arm 26 pivoted, at one end, on a pin 27 projecting upwardly from ring 21, a freely rotatable, upstanding pinch roller 28 carried by the opposite or free end portion of arm 26, and a tape engaging member or pin 29 extending upwardly from arm 26 intermediate its ends. The tape engaging assembly 25 is located on support ring 21 so that, when the support ring is turned to its operative position to dispose assembly 25 as shown in full lines on FIG. 1, pinch roller 28 is adjacent capstan 14 for cooperation with the latter in driving the magnetic tape therebetween. In the apparatus as shown, a spring 30 acts on support arm 26 to urge the latter outwardly relative to ring 21 against a stop 31 for providing a small gap between pinch roller 28 and capstan 14, and an additional mechanism, indicated schematically at 32, may be provided to angularly displace support arm 26 in the inward direction for pressing pinch roller 28 against capstan 14. Such additional mechanism 32 may be simply constituted by a solenoid having an armature 32*a* which is extended to act inwardly against arm 26 in response to the energization of solenoid 32 during a recording or reproducing operation of the apparatus.

When support ring 21 is turned in the clockwise direction through approximately 250° from its operative position shown in full lines on FIG. 1 to its starting or inactive position, the tape engaging assembly is at the location indicated in broken lines at 25' on FIG. 1. It will be apparent that, with support ring 21 at its starting or inactive position, the downward movement of holding device 3 with a cassette 4 positioned thereon causes the pinch roller and the tape guiding member at the positions indicated at 28' and 29', respectively, to project upwardly into opening 10 of cassette housing 7 at the side of tape run $T_1$ facing away from guide drum 1.

Tape loading and unloading device 20 is further shown to include a tape shifting assembly 33, which is hereinafter described in detail with reference to FIGS. 8–10, but is shown on FIG. 1 to include a tape shifting pin 34 projecting upwardly from one end of a support arm 35 which extends swingably over ring 21 from a pivot pin 36 carried by chassis 2. For the time being, it is sufficient to note that the movements of arm 35 are controlled so that, with ring 21 in its operative position, tape shifting pin 34 is in the position shown in full lines on FIG. 1 and, with ring 21 in its starting or inactive position, the tape shifting pin is at the position indicated in broken lines at 34' so as to also project upwardly into opening 10 of cassette housing 7 at the side of tape run $T_1$ facing away from guide drum 1.

An upstanding tape guide pin 42 is also shown to be mounted on support ring 21 at a fixed location spaced by a relatively small distance from pinch roller 28 in the clockwise direction so that, when support ring 21 is in its starting or inactive position, such tape guiding pin will be at the location indicated in broken lines at 42' for projecting upwardly into opening 10 of cassette housing 7 received by the lowered cassette holder 3.

The illustrated tape loading and unloading device 20 is further shown to comprise a tape guiding assembly 43 which is mounted on support ring 21 and includes a tape guiding member or pin 44. As shown in disclosed in detail in said U.S. Pat. application Ser. No. 354,992, tape guiding member 44 is mounted on support ring 21 for movement relative to the latter from an inner position indicated in broken lines at 44', at which such tape guiding member is spaced from pinch roller 28' by a relatively small distance along ring 21 in the clockwise direction so as to also project upwardly into cassette opening 10 with the support ring 21 at its starting position, to an outer position shown in full lines on FIG. 1 in response to movement of the support ring to its operative position during a loading operation, at which outer position tape guiding member 44 is spaced outwardly from support ring 21 and also spaced a relatively large distance from pinch roller 28 in the clockwise direction along support ring 21. In order to permit the foregoing movements of tape guiding member 44 relative to ring 21, tape guiding assembly 43 is further shown to include an arm 45 pivoted, at one end, on a pin 46 carried by ring 21 and being urged by a spring 47 in the counterclockwise direction relative to ring 21. The free end portion of arm 45 carries a pin 48 on which there is pivoted one end of a generally L-shaped support arm 49 having the tape guiding member or pin 44 projecting upwardly therefrom, and the free end of L-shaped arm 49 has a locating pin 50 depending therefrom. Further, the free end of arm 45 has an upwardly bent tab **45*a* engageable by arm 49 for limiting the clockwise turning of arm 49 relative to arm 45. When support ring 21 is in its starting or inactive position, the turning of arm 45 in the counterclockwise direction by spring 47 is limited to the position shown in broken lines on FIG. 1 by the engagement of depending pin 50 on arm 49 in a recess 51 formed in the top of support ring 21 and which is then at the position 51', and by the engagement of tab 45*a* with the adjacent arm 49. With arms 45 and 49 being thus located, arms 45 and 49 extend generally along ring 21 from pivot pin 46 in the direction toward pinch roller 28, and tape guiding member or pin 44 is disposed at its inner position relatively close to pinch roller 28.**

In order to move tape guiding member or pin 44 from such inner position to its outer position in response to turning of support ring 21 from its starting position to its operative position, tape loading and unloading device 20 is further shown to comprise an actuating member 52 which is fixedly located on chassis 2 at a location adjacent support ring 21 past which pivot pin 46 moves during the turning of support ring 21 between its starting and operative positions. Actuating member 52 includes a base portion **52*a* secured to chassis 2 and an elongated, elevated portion 52*b* which projects from base portion 52*a* over the outer periphery of ring 21. Elevated portion 52*b* has an elongated slot 53 opening at the free end of portion 52*b* for receiving locating pin 50 of tape guiding assembly 43 as ring 21 is moved from its starting or inactive position toward its operative position. Slot 53 is shown to diverge from ring 21 in the direction from its open end toward its opposite end which terminates in a laterally enlarged locking portion 53*a*.**

The tape loading and unloading device 20, insofar as it is described above, operates as follows:

Starting with support ring 21 in its starting or inactive position so that the tape engaging assembly 25, tape guiding assembly 43, tape shifting pin 34 and tape guiding pin 42 are in the positions shown in broken lines at 25',43', 33' and 42', respectively, on FIG. 1, a cassette 4 is disposed on holding device 3 and the latter is lowered to its operative position, as hereinafter described, for causing pinch roller 28', tape engaging member 29', pins 34' and 43', and tape guiding member 44' to extend upwardly into cassette opening 10 at the side of tape run $T_1$ facing away from guide drum 1. Motor 24 is then suitably energized to cause drive roller 23 to turn support ring 21 in the counterclockwise direction. Such rotation of ring 21 causes tape engaging member 29 to draw a loop L of the tape T from cassette 4 and to wrap a side $L_1$ of the tape loop about a portion of the periphery of guide drum 1. It will be noted that, as the tape loop L is thus formed by tape engaging member 29, pinch roller 28, pins 34 and 42 and tape guiding member 44 are all disposed within the tape loop. During continued turning of ring 21 in the counterclockwise direction, the tape loop L is progressively extended and its side $L_1$ is further wrapped about the periphery of guide drum 1, while the other side $L_2$ of tape loop L is engaged successively by tape guide pin 42 and tape guiding member 44 and thereby held away from the peripher of guide drum 1. In the course of the counterclockwise turning of ring 21, locating pin 50 enters slot 53 of actuating member 52 (FIG. 4) and moves along slot 53 toward the locking portion **53*a*. As pin 50 moves along slot 53 and pivot pin 46 continues in the counterclockwise direction along the circular path of ring 21, arms 45 and 49 initially swing as a unit in the clockwise direction about pivot pin 46 and, when locating pin 50 reaches the closed end of slot 53 defined by locking portion 53*a*, arm 49 jack-knifes in the counterclockwise direction relative to arm 45 and causes rapid turning of arm 45 in the clockwise direction about pivot pin 46. Thereafter, continued movement of pivot pin 45 in the counterclockwise direction along the circular path of ring 21, while locating pin 50 is retained in locking portion 53*a* of slot 53, causes arm 49 to turn in the clockwise direction relative to arm 45 until arm 49 again abuts against tab 45*a* on arm 45, for example, as shown in full lines on FIG. 1. Thus, tape guiding member 44 is moved to its outer position relative to ring 21 and, in so doing, is also relatively widely spaced from the tape engaging member 29 and pinch roller 28 in the direction along support ring 21**.

As support ring 21 nears its operative position shown in full lines on FIG. 1, abutment 41 depending from ring 21 acts upon bell-crank 38 to pivot the latter in the clockwise direction to the illustrated position, whereby arm 34 is turned about pivot 35 to swing guide pin 33 to the position shown in full lines. Thus, guide pin 33 acts on the tape loop side $L_1$ between drum 1 and guide pin 8*a* to cause loop side $L_1$ to engage guide pin 18 and erase head 16. When support ring 21 attains its operative position, the tape loop side $L_1$ between drum 1 and tape engaging member 29 is engaged with guide pin 17 and head assembly 15 and passes between capstan 14 and pinch roller 28 which is disposed adjacent the capstan. Thus, the tape loading operation is completed and the operation of motor 24 is suitably discontinued. Upon the completion of the tape loading operation, a recording or reproducing operation can be initiated, as hereinafter described, and during such operation tape T is transported about guide drum 1 from supply reel 5 to take-up reel 6, for example, by energizing solenoid 32 to cause pinch roller 28 to press the tape against rotated capstan 14 and by suitably rotating take-up reel shaft 13.

At any desired time, the recording or reproducing operation can be discontinued, and an unloading operation initiated by suitably operating motor 24 to drive support ring 21 in the clockwise direction from the position shown in full lines to the position shown in broken lines on FIG. 1. During such turning of ring 21, one or the other of reel shafts 12 and 13 may be suitably rotated to take up, on the respective reel 5 or 6, the slack tape that results from the movement of tape engaging member 29 and the consequent reduction of the size of tape loop L. Further, the action of tape guiding assembly 43 is reversed in passing from the condition shown in full lines on FIG. 1 to the condition shown in broken lines.

Upon the return of support ring 21 to its starting or inactive position, the tape T is fully unwrapped from guide drum 1 and restored to the run $T_1$ between guide pins 8*b* and 9*b* in cassette 4. Further, pinch roller 28, tape engaging member 29, tape guiding pin 42 and tape guiding member 44 are restored to the positions within cassette opening 10 as indicated in broken lines at 28', 29', 42' and 44', respectively. Thus, the holding device 3 can be raised to permit the removal of cassette 4 therefrom.

Referring now to FIGS. 2–5, it will be seen that the cassette holding device 3 provided in the above described apparatus in accordance with this invention comprises a table 55 having a locating flange 56 along its front edge and locating lugs 57 projecting from its back edge for positioning the cassette 4 when the latter is placed on table 55. Tabel 55 further has openings 58 and 59 through which reel support shafts 12 and 13 can project upwardly when table 55 is lowered to its operative position. Table 55 extends between, and is supported by a pair of support levers 60A and 60B which project forwardly from table 55 and, at their forward ends, are pivotally mounted, as at 61, on respective brackets 62A and 62B secured on chassis 2. The forward end of each of support levers 60A and 60B has a depending portion 63 with a flange 64 thereon, and a spring 65 is connected between flange 64 and a lug 66 on the respective bracket 62A or 62B so that support levers 60A and 60B and table 55 therebetween are urged to a raised or cassette receiving position (FIG. 3) limited by the engagement of flanges 64 on levers 60A and 60B with flanges 67 on the respective brackets 62A and 62B.

After a cassette 4 has been placed on table 55 between flange 56 and lugs 57 and laterally located by support levers 60A and 60B, the cassette 4 may be pressed downwardly to swing table 55 and levers 60A and 60B, against the force of springs 65, to an operative position (FIG. 4) in which reel support shafts 12 and 13 project through openings 58 and 59 and engage in hubs 5*a* and 6*a* of the supply and take-up reels in cassette 4, and further in which pinch roller 28', tape engaging member 29', pins 34' and 42' and tape guiding member 44' (FIG. 1) extend upwardly through a cutout 55*a* in the back portion of table 55 (FIG. 2) and into the cassette opening 10. The downward movement of table 55 to its operative position may be limited by posts 68 which project upwardly from chassis 2 (FIGS. 3 and 4) and terminate in locating pins 69 adapted to extend through corresponding openings (not shown) in table 55 and to seat in corresponding sockets in the bottom surface of cassette 4.

In accordance with the present invention, the cassette holding device 3 is provided with a cassette locking assembly 70 by which the table 55 is retained in its lowered or operative position with the cassette 4 locked thereon, that is, held against accidental removal from cassette holding device 3, so long as support ring 21 is displaced from its starting or inactive position. Thus, cassette holding device 3 is secured in its operative position and cassette 4 cannot be removed therefrom whenever the tape has been withdrawn from cassette 4 in response to movement of support ring 21 from its inactive position. Accordingly, at the time of removal of cassette 4 from holding device 3 all of the tape must be returned to the cassette housing 7 to prevent damage to the tape by reason of such removal.

Figure 3:
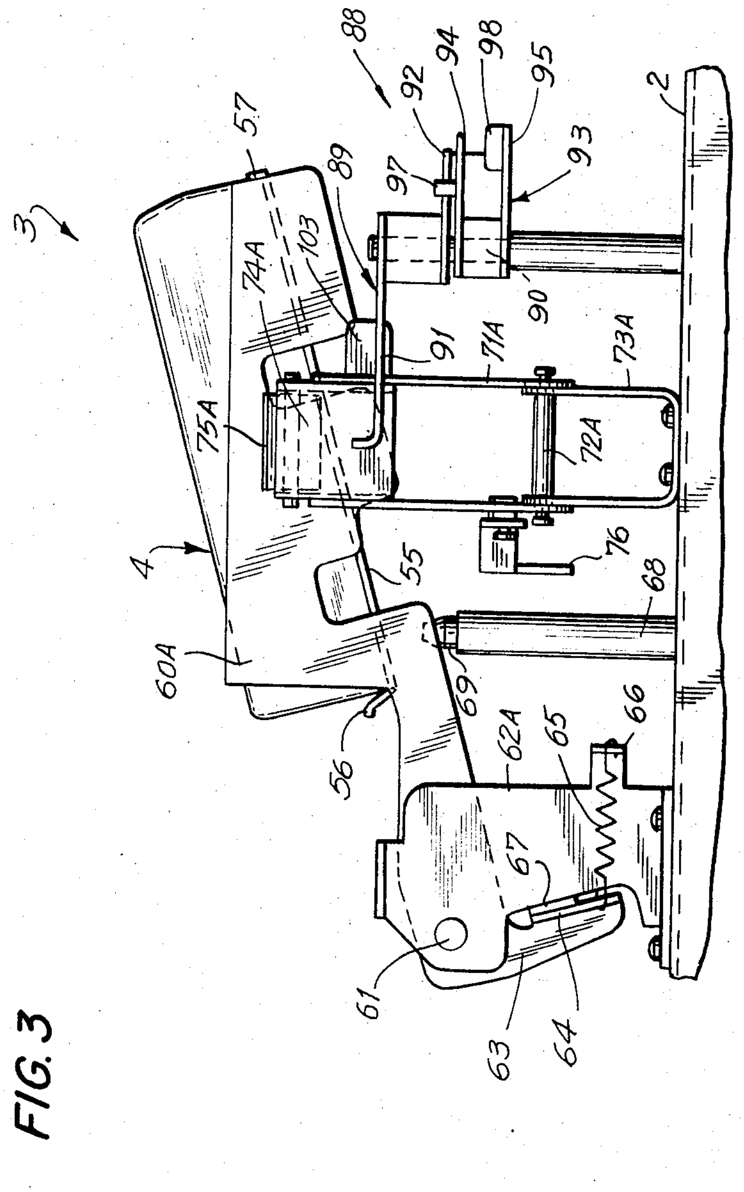
FIGS. 3 and 4 are side elevational views of the cassette holding device of FIG. 2 which respectively show the device in the condition for the insertion or removal of a cassette and in the condition where the cassette is secured or locked in the cassette holding device in an operative position of the latter.
Figure 4:
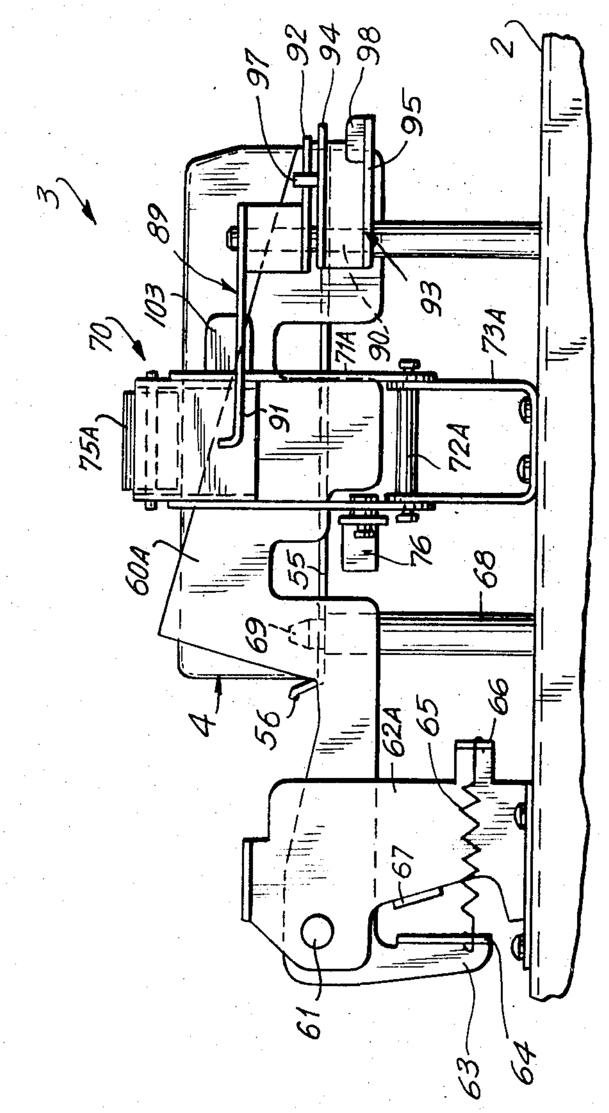
Figure 5:
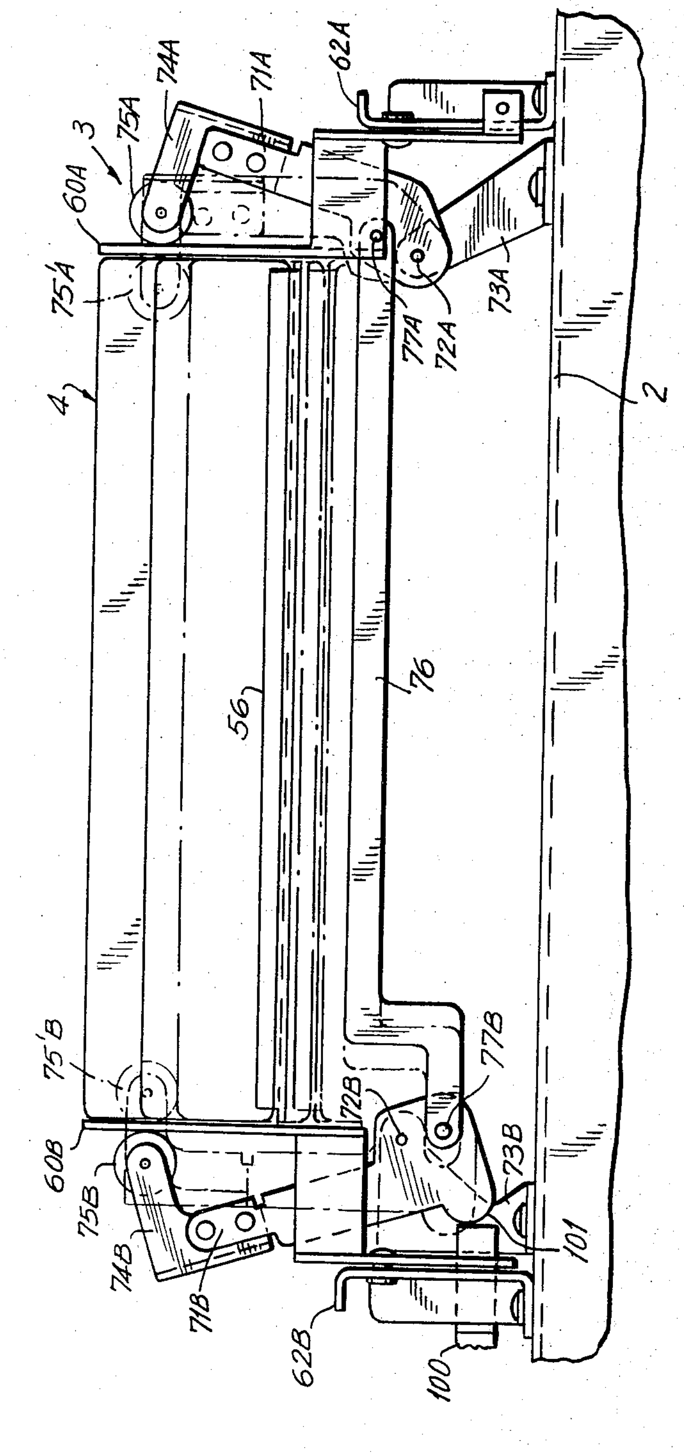
FIG. 5 is a front elevational view of the cassette holding device which is shown in full lines in the condition of FIG. 3 and in broken lines in the condition of FIG. 4.

In the embodiment of FIGS. 2–5, cassette locking assembly 70 is shown to include locking arms 71A and 71B which extend upwardly at the outer sides of support levers 60A and 60B, respectively, and which have their lower end portions pivoted on pins 72A and 72B carried by respective brackets 73A and 73B secured on chassis 2. Locking arms 71A and 71B have bifurcated, inwardly directed upper end portions 74A and 74B between which rollers 75A and 75B are rotatably supported. A connecting rod 76 extends laterally under table 55 and is pivotally connected at one end, as at 77A, to locking arm 71A above the pivot pin 72A for the latter, while the other end of rod 76 is pivotally connected, as at 77B, to locking arm 71B below the pivot pin 72B for arm 71B (FIG. 5). By reason of the connecting rod 76, rollers 75A and 75B are movable simultajeously between their outward or released positions shown in full lines on FIG. 5 and their inward or locking positions indicated in broken lines at 75'A and 75'B.

When table 55 is in its raised or cassette receiving position, as shown in full lines on FIG. 5, rollers 75A and 75B ride against the outer surfaces of support levers 60A and 60B, respectively, and thereby retained in their outer or released positions. However, when table 55 is pressed downwardly to its operative position with a cassette 4 thereon, the upper arm portions 74A and 74B can project inwardly over the upper edges of adjacent support levers 60A and 60B to dispose rollers 75A and 75B in their locking positions where they bear downwardly upon the upper surface of cassette 4.

In accordance with the present invention, an actuating mechanism 78 is provided for cassette locking assembly 70 which is effective to permit rotation of support ring 21 from its starting or inactive position for initiating a tape loading operation only when cassette holding table 55 is in its operative position so that rollers 75A and 75B can move to their locking positions, and further to secure rollers 75A and 75B in their locking positions for retaining table 55 in its operative position and preventing removal of cassette 4 from the table when support ring 21 is displaced from its starting or inactive position.

Figure 2:
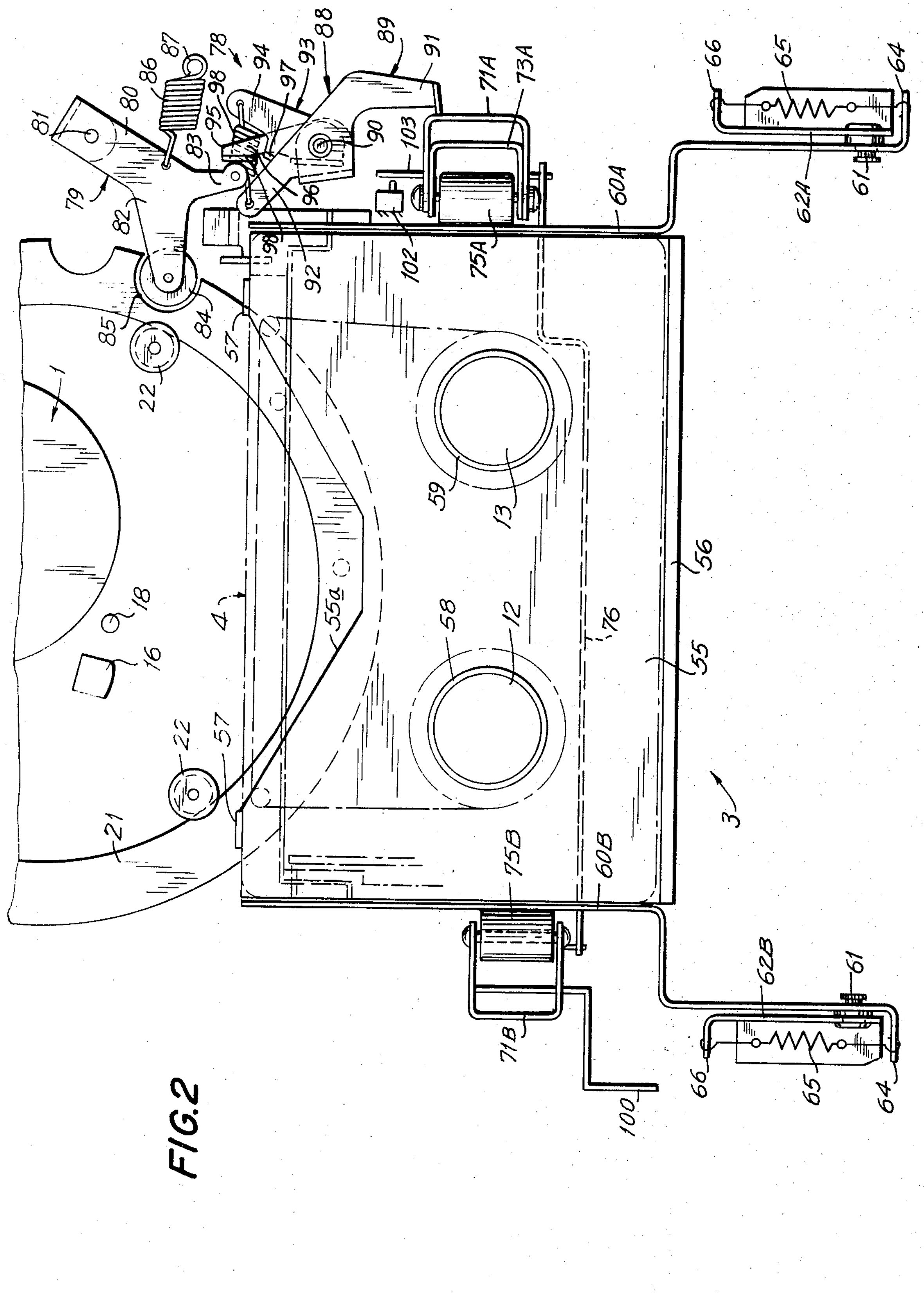
FIG. 2 is a schematic top plan view showing details of a cassette holding device provided, in accordance with this invention, for the recording and/or reproducing apparatus of FIG. 1, and which is shown in the condition thereof for permitting insertion and removal of a cassette.

In the embodiment of the invention shown on FIGS. 2–4, actuating mechanism 78 for performing the above functions includes a Y-shaped lever 79 having a stem 80 pivoted adjacent its end on a pin 81 carried by chassis 2 and branch arms 82 and 83 which diverge from stem 80. A cam follower roller 84 is rotatably mounted on the end of branch arm 82 and, when support ring 21 is in its starting or inactive position as shown on FIGS. 2, cam follower roller 84 is engageable in a semi-circular cutout or recess 85 suitably located in the outer periphery of ring 21 at the level of roller 84. A spring 86 is connected between lever 79 and an anchor 86 on chassis 2 for urging lever 79 in the counter-clockwise direction, as viewed on FIG. 2, that is, in the direction for withdrawing roller 84 from recess 85.

Figure 6:
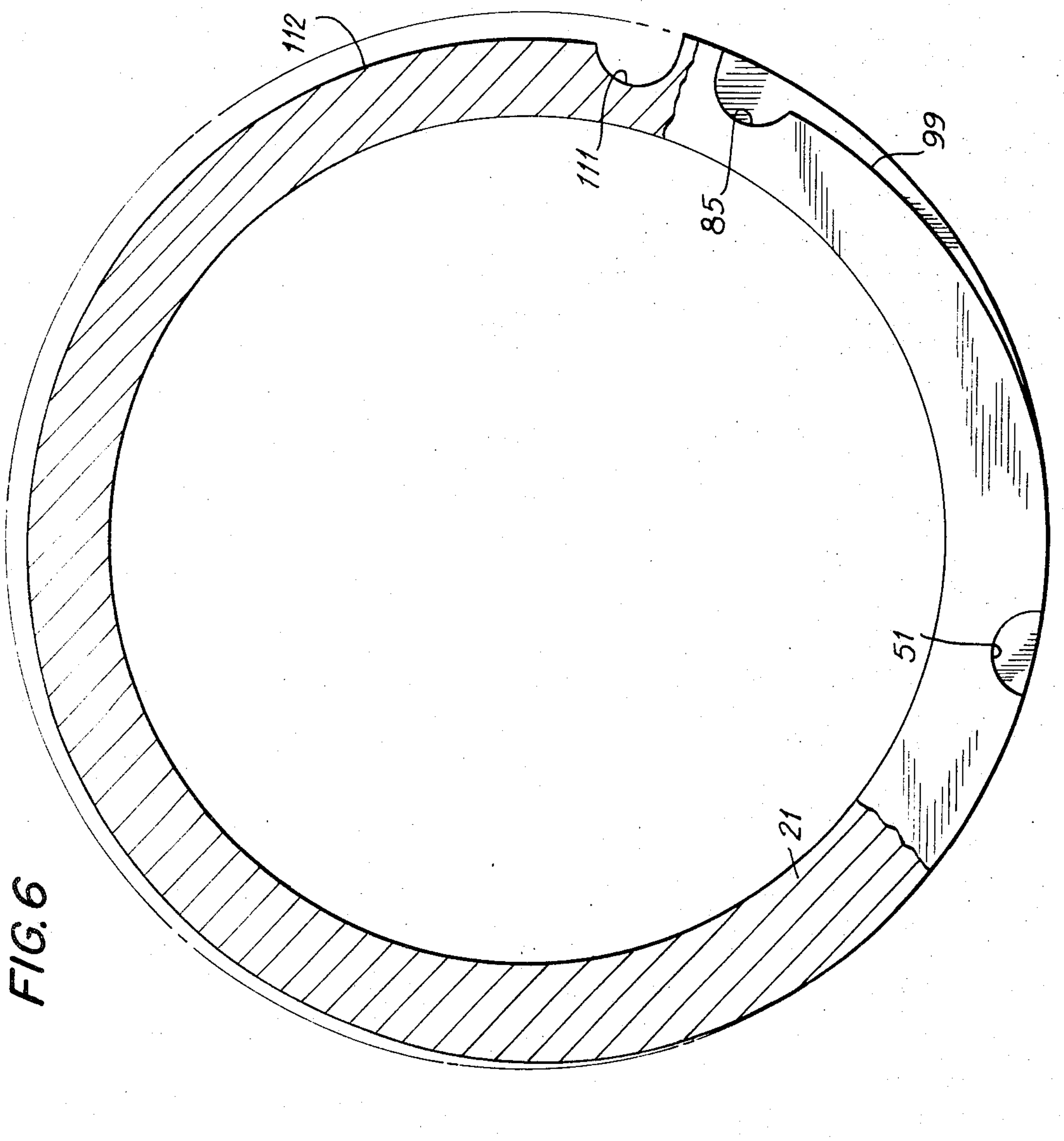
FIG. 6 is a detail plan view, partly broken away and in section, of the support ring of the tape loading and unloading device and particularly showing control cams that are formed therein.

Actuating mechanism 78 is further shown to include a connecting assembly 88 between lever 79 and locking arm 71A. Such connecting assembly 88 includes a main lever 89 pivotally mounted, intermediate its ends, on a post or pin 90 carried by chassis 2 and having vertically offset arms 91 and 92 which are directed in substantially opposed directions. As shown, arm 91 of main lever 89 extends adjacent upper portion 74A of locking arm 71A and is engageable thereagainst to pivot locking arm 71A, and through connecting rod 76, also locking arm 71B, in the directions for moving the respective locking rollers 75A and 75B to their locking positions in response to turning of main lever 89 in the clockwise direction from the position shown on FIG. 2. Connecting assembly 88 further includes an auxiliary lever 93 pivoted on pin 90 below lever 89 and having vertically offset arms 94 and 95 which are angularly spaced from each other by an acute angle. A spring 96 is connected between arm 92 of main lever 89 and arm 94 of auxiliary lever 93 for urging levers 89 and 93 to turn as a unit about pin 90 with the relatively angular positioning of levers 89 and 93 being determined by the engagement of arm 92 against a lug 97 on arm 94 under the urging of spring 96. Further, a flange 98 on the end of arm 95 is engageable by arm 83 of lever 79 in the direction for turning levers 89 and 93 clockwise from the positions shown on FIG. 2 in response to counter-clockwise turning of lever 79 by spring 86. As shown on FIG. 6, a cam surface 99 is formed on the periphery of support ring 21 extending in the clockwise direction from recess 85 at the level of the latter, and such cam surface 99 is at progressively increasing radial distances from the center of rotation of ring 21 along at least its initial portion extending from recess 85. Further, as shown schematically on FIGS. 2 and 5, a resilient lever 100 extends at the outside of projections 101 (FIG. 5) formed on locking arm 71B below the pivot 72B for the latter, and such lever 100 is suitably moved toward the right, as viewed on the drawings, when an eject button (not shown) is actuated for initiating a tape unloading operation and the removal or ejection of the cassette 4. Finally, a switch 102 (FIG. 2) for initiating the operation of motor 24 for a tape loading operation is located adjacent to locking arm 71A and is actuable by an abutment 103 (FIGS. 2–4) on arm 71A when the latter moves to its locking position.

The above described cassette holding device 3 and its locking assembly 70 operate as follows:

Starting with support ring 21 in its starting or inactive position and with table 55 in its raised or cassette receiving position (FIGS. 2 and 3), rollers 75A and 75B engage the outer surfaces of support levers 60A and 60B so that cam follower roller 84 is held in recess 85 against the face of spring 86. When a cassette 4 is placed on table 55 and pressed downwardly to the position shown on FIG. 4, rollers 75A and 75B extend above the upper edges of levers 60A and 60B or are released from the latter so as to be movable inwardly over the latter and onto the top surface of the cassette. Upon such release of rollers 75A and 75B, spring 86 pivots Y-shaped lever 79 in the direction to remove cam follower roller 84 from recess 85, and such pivotal movement is transmitted through auxiliary lever 93 and spring 96 to main lever 89 of connecting assembly 88 so that arm 91 of lever 89 pushes inwardly against locking arm 71A for moving its roller 75A on top of cassette 4. The inward rocking of locking arm 71A is transmitted through rod 76 to locking arm 71B to cause similar inward rocking of the latter for moving its roller 75B on top of cassette 4. The removal of cam follower roller 84 from recess 84 frees support ring 21 for rotation, and the described inward rocking of locking arm 71A causes its abutment 103 to actuate switch 102 so that motor 24 is energized to rotate support ring 21 in the counter-clockwise direction as viewed on FIG. 2, that is, in the direction for the previously described tape loading operation. During such rotation of ring 21, cam follower roller 84 rides on cam surface 99 so that Y-shaped lever 79 is further turned in the counter-clockwise direction, as viewed on FIG. 2, whereby auxiliary lever 93 is further turned clockwise and, through spring 96, urges main lever 89 to turn in the same direction for increasing the downward pressure of locking rollers 75A and 75B on cassette 4. Thus, the cassette is securely held on table 55 with the latter in its lowered or operative position during the tape loading operation and, thereafter, so long as support ring is displaced from its inactive position.

When it is desired to remove cassette 4 from holding device 3, for example, at the completion of a recording or reproducing operation, manual actuation of the previously mentioned eject button (not shown) suitably initiates operation of motor 24 for turning support ring 21 in the clockwise direction, that is, in the direction for the tape unloading operation. Actuation of the eject button further causes resilient lever 100 to press elastically against projections 101 on locking arm 71B for urging locking arms 71A and 71B, and the rollers 75A and 75B thereon outwardly from their locking positions shown in broken lines on FIG. 5. Of course, during the tape unloading operation, outward movement of rollers 75A and 75B from their locking positions is prevented by engagement of cam follower roller 84 with cam surface 99 on ring 21 so that the cassette continues to be securely held by rollers 75A and 75B. During the concluding portion of the tape unloading operation, that is, as cam follower roller 84 rides on the part of cam surface 99 near recess, Y-shaped lever 79 begins to turn in the clockwise direction against the force of spring 86 by reason of the elastically applied force of lever 100 transmitted thereto through locking arm 71B, rod 76, locking arm 71A, main lever 89, spring 96 and auxiliary lever 93, and rollers 75A and 75B commence to move outwardly from their locking positions. At the completion of the tape unloading operation, that is, when support ring 21 returns to its inactive position where recess 85 is disposed to receive cam follower roller 84, the force of lever 100 can complete the outward movement of rollers 75A and 75B to their released positions shown in full lines on FIG. 5, and connecting assembly 88 further turns lever 79 against the force of spring 86 to seat roller 84 in recess 85. When rollers 75A and 75B are moved outwardly to their released positions, as aforesaid, table 55 with cassette 4 thereon is freed for upward movement by springs 65 to the position shown on FIG. 3 at which the cassette is easily removable from the cassette holding device 3.

It will be noted that in the actuating mechanism 78 described above with reference to FIGS. 2–4, the spring 95 connecting levers 89 and 93 of connecting assembly 88 ensures that damage will not be done to either the mechanism 78 or the cassette 4 locked by rollers 75A and 75B by reason of dimensional variations of the components of mechanism 78 or of the cassette within the normal tolerances. By reason of the spring 95, during a cassette locking operation, as described above, the angular relation of levers 89 and 93 is automatically adjusted to accommodate the mentioned dimensional variations.

Figure 7:
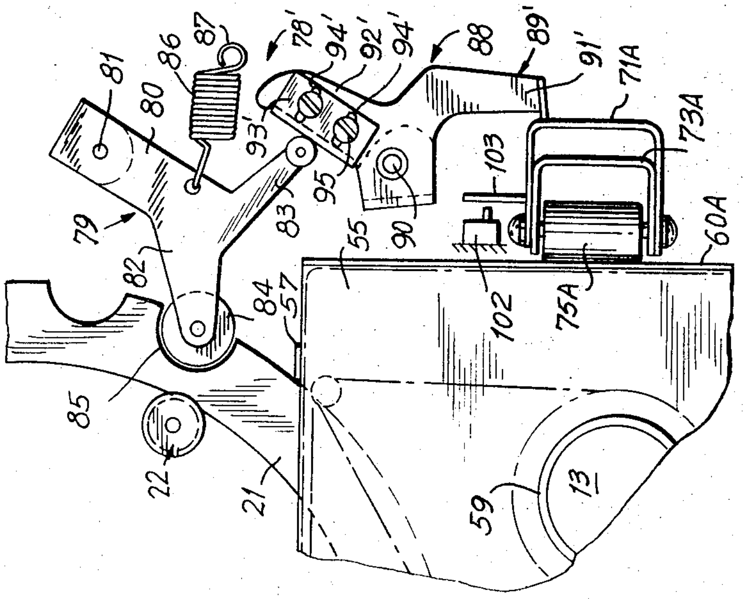
FIG. 7 is a schematic fragmentary top plan view similar to a portion of FIG. 2, but showing a cassette holding device according to another embodiment of the invention.

The possibility of damage to the actuating mechanism or to the cassette can also be avoided with the modified actuating mechanism 78′ shown on FIG. 7. The actuating mechanism 78′ is shown to comprise the previously described Y-shaped lever 79 pivoted at 81 and having an arm 82 carrying cam follower roller 84 and an arm 83 which is engageable with a connecting assembly 88′. In this embodiment, connecting assembly 88′ consists of a single lever 89′ pivoted on pin 90 and having generally opposed arms 91′ and 92′. As before, arm 91′ is engageable inwardly against adjacent locking arm 71A. Arm 92′ extemds across the path of travel of branch arm 83 of lever 79 when the latter is pivoted by spring 86, and a bearing plate 93′ is adjustably secured on arm 92′ for engagement by the adjacent end of arm 83. For example, bearing plate 93′ may be provided with slots 94′ extending transversely relative to arm 92′ and receiving screws 95′ that are threaded into tapped holes in arm 92′. It will be apparent that slots 94′ and screws 95′ permit adjustment of bearing plate 93′ relative to arm 92′ so as to compensate for dimensional variations in the components of mechanism 78′. Further, if during the locking of a cassette on table 55, as described above, the locking rollers 75A and 75B exert an excessive pressure on he casssette, for example, by reason of an excessive height of the latter, plate 93′ can slip relative to arm 92′ to prevent damage to the actuating mechanism 78′.

Figure 8:
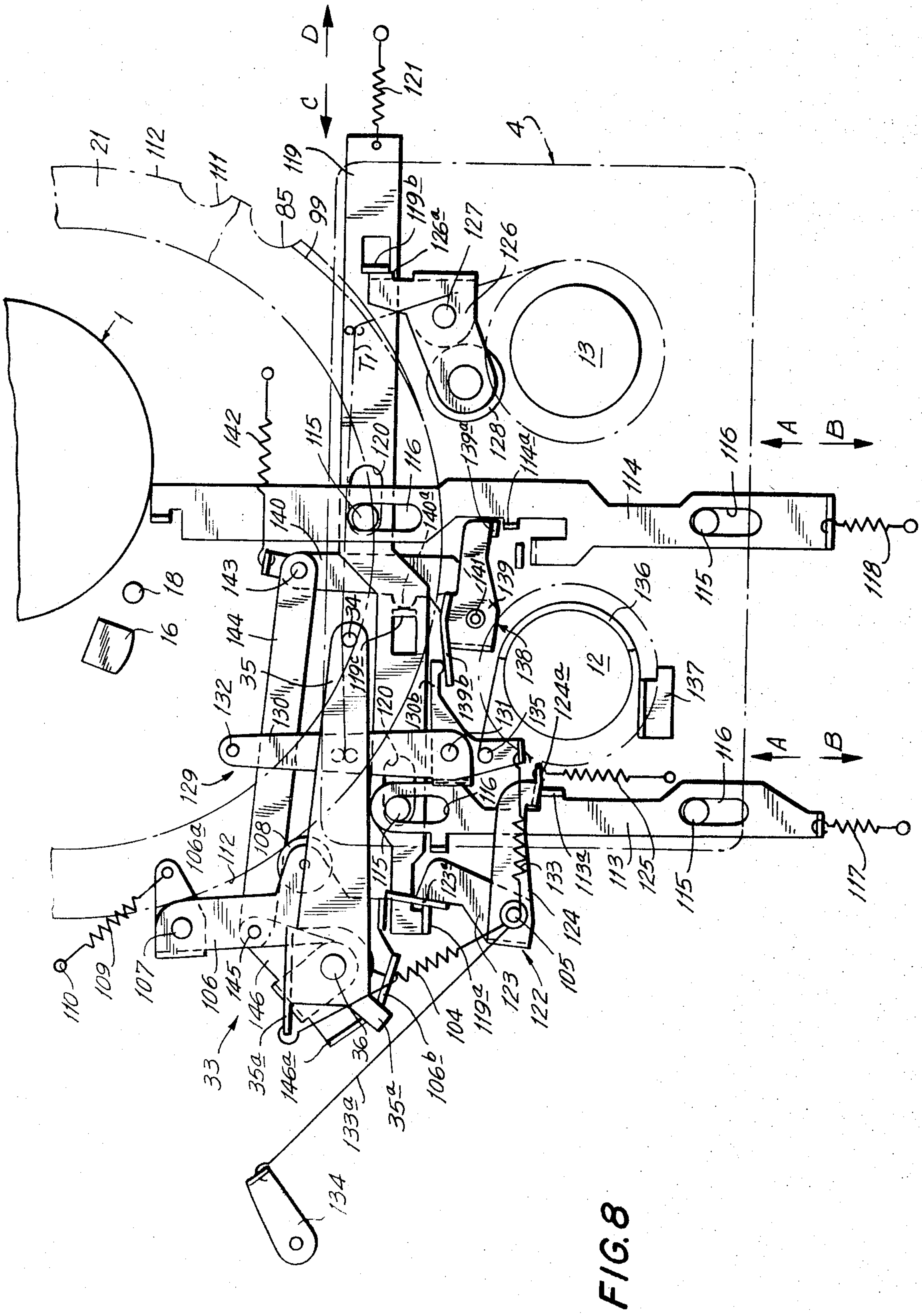
FIG. 8 is a schematic top plan view of a tape shifting assembly and the actuating mechanisms therefor provided, in accordance with this invention, for the recording and/or reproducing apparatus of FIG. 1, and which is shown in the condition thereof prior to the initiation of a tape loading operation or upon the completion of a tape unloading operation.
Figure 9:
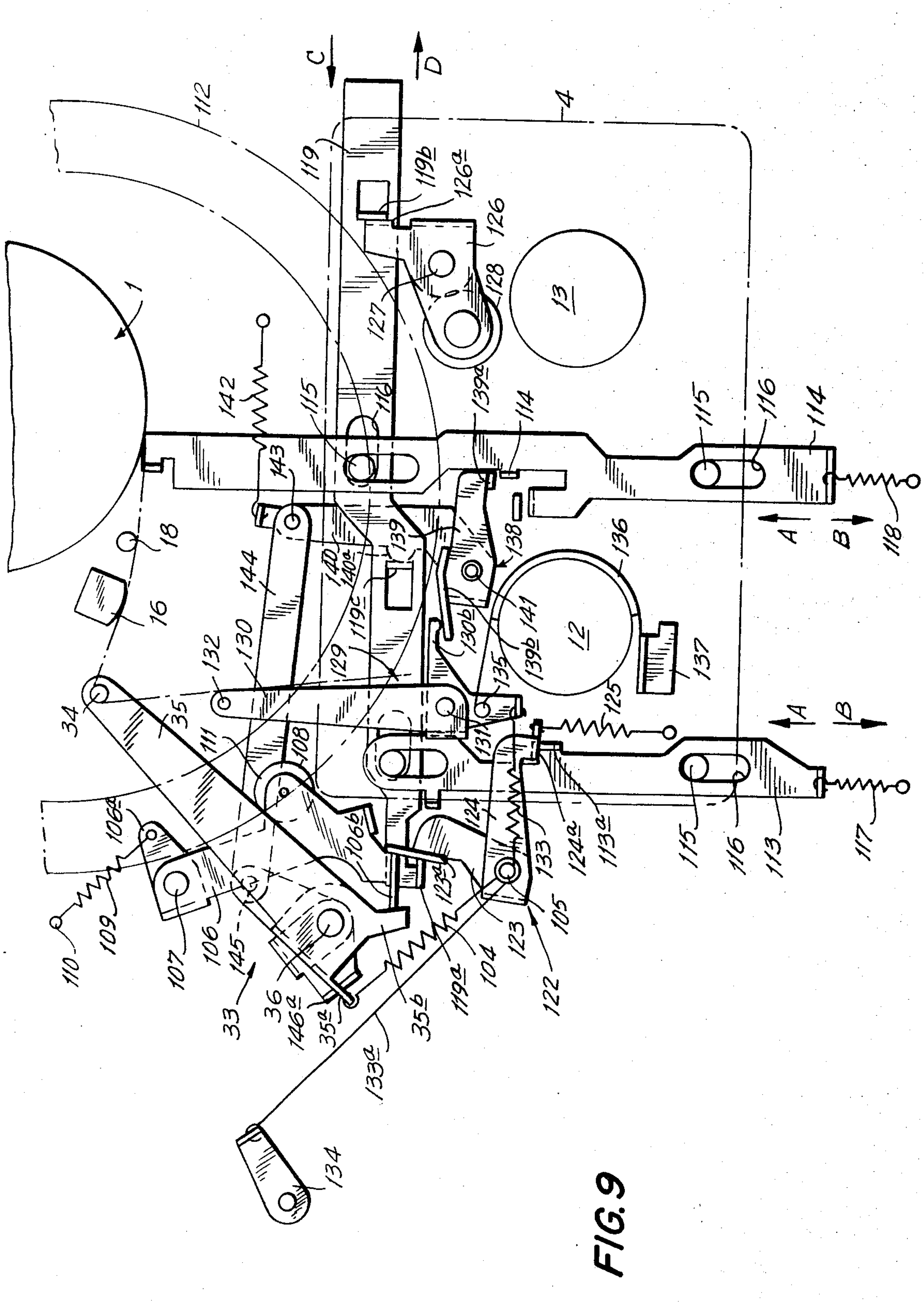
FIGS. 9 and 10 are views similar to FIG. 8, but respectively showing the tape shifting assembly and actuating mechanisms therefor in the condition at the completion of a tape loading operation, and in the condition for a recording or reproducing operation.
Figure 10:
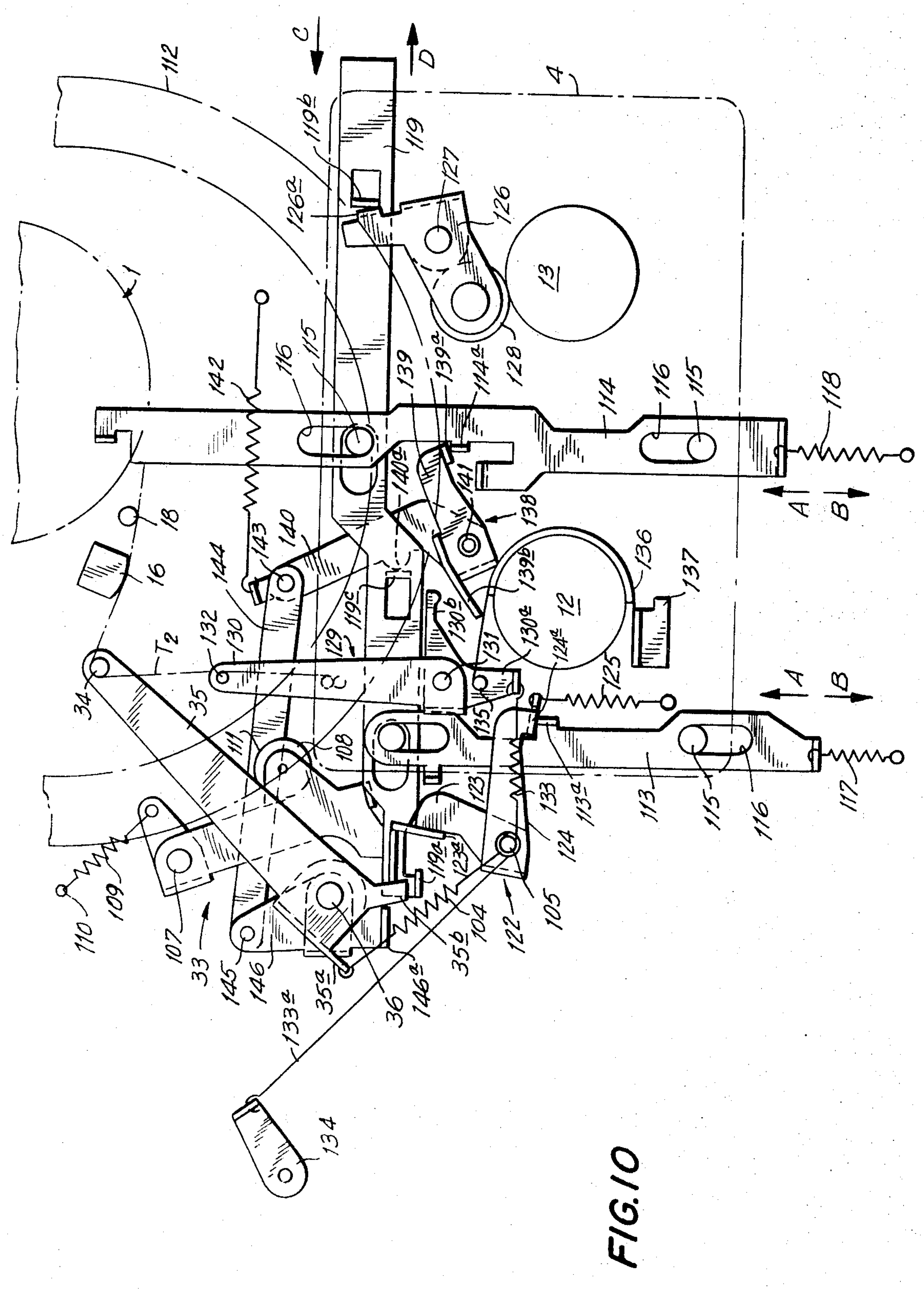

Referring now to FIGS. 8–10, it will be seen that, in accordance with the embodiment of the invention there illustrated, the tape shifting assembly 33 includes a spring 104 connected between an extension **35*a* of support arm 35 and a post 105 extending from chassis 2 for urging arm 35 in the counterclockwise direction, that is, in the direction for moving tape shifting pin 34 from its inoperative position (FIG. 8) to its operative position (FIGS. 9 and 10). A control member or lever 106 for controlling the movements of tape shifting pin 34 is pivoted, at one end, on a pin 107 carried by chassis 2 adjacent ring 21 and carries a rotatable cam follower roller 108 which is urged against the periphery of support ring 21 by a spring 109 connected between arn arm 106*a* of lever 106 and an anchor 110 on the chassis. The free end portion of lever 106 extends adjacent the pivoted end of support arm 35 and has an upstanding lug 106*b* engageable by an extension 35*b* of arm 35 for limiting the swinging of the latter by spring 104. As shown particularly on FIG. 6, the periphery of support ring 21 is formed with a recess 111 adjacent recess 85 and located to receive cam follower roller 108 when support ring 21 is in its operative position (FIGS. 9 and 10). The periphery of ring 21 is further formed with a cam surface 112 (FIG. 6) extending from recess 111 in the counterclockwise direction and being at progressively decreasing radial distances from the center of rotation of ring 21 in the clockwise direction, that is, in the direction toward recess 111. The cam surface 112 may be at a level on ring 21 different from that of cam surface 99, and is engageable by cam follower roller 108 during turning of support ring 21 between its inactive or starting position (FIG. 8) and its operative position (FIGS. 9 and 10**).

With support ring 21 in its inactive position, the engagement of roller 108 with the portion of cam surface 112 at a relatively large radial distance from the rotational center of ring 21 disposes control lever 106 in the position shown on FIG. 8 where its lug **106*b* engaged by extension 35*b* of lever 35 places tape shifting pin 34 in its inoperative position. When a cassette 4, indicated in broken lines on FIG. 8, is lowered to its operative position and there locked, as previously described in connection with the cassette holding device 3 according to this invention, the tape shifting pin 34, in its inoperative position, extends upwardly into the opening of cassette 4 at the side of tape run $T_1$ facing away from guide drum 1.**

When support ring 21 is turned in the counterclockwise direction during a tape loading operation, as previously described, cam follower roller 108 rides on successive portions of cam surface 112 that are at progressively decreasing radial distances from the rotational center of ring 21 so that control lever 106 turns gradually in the counter-clockwise direction about pivot 107 from the position shown on FIG. 8. The resulting movement of lug **106*b* ahead of extension 35*b* permits spring 104 to gradually turn arm 35 in the counter-clockwise direction so that tape guiding pin 34 moves out of cassette 4** and correspondingly shifts the tape engaged thereby.

At the completion of the tape loading operation, that is, when ring 21 arrives at its operative position, cam follower roller 108 is received in recess 111 (FIG. 9) so that control lever 106 is further turned in the counter-clockwise direction to permit turning of arm 35 in the same direction for disposing tape shifting pin 34 in its operative position at which the tape is sufficiently wrapped about guide drum 1 and engaged with erasing head 16.

As shown on FIGS. 8–10, the illustrated recording and/or reproducing apparatus further has an ejection selecting slide 113 and a recording and reproducing selecting slide 114 which extend under the cassette holding device and which are mounted on the chassis 2, for example, by pins 115 engaging in slots 116, for movement parallel to each other in the directions of the arrows A and B. Springs 117 and 118 are connected to slides 113 and 114, respectively, for urging such slides forwardly, that is, in the direction of arrows B, to the positions shown on FIG. 8, Ejection selecting slide 113 is displaced in the direction of arrow A upon actuation of the eject button (not shown), and recording and reproducing selecting slide 114 is similarly displaced in the direction of arrow A upon actuation of a recording and reproducing button (not shown). An auxiliary slide 119 extends across slides 113 and 114 and is mounted for movement in the directions of the arrows C and D, for example, by means of slits 120 formed in slide 119 and receiving the mounting pins 115. A spring 121 is connected to slide 119 for urging the latter in the direction of arrow D to the position shown on FIG. 8.

An L-shaped lever 122 is pivoted on post 105 and includes substantially right angularly related arms 123 and 124. A spring 125 is connected to an abutment **124*a* at the end of arm 124 for urging lever 122 in the clockwise direction and maintaining engagement of abutment 124*a* with a lug 113*a* extending from slide 113. An abutment 123*a* is provided at the free end of arm 123 for engagement with the upstanding lug 106*b* of control lever 106. The abutment 123*a* is further engageable with an upstanding lug 119*a* formed on auxiliary slide 119 at the left-hand end of the latter. Auxiliary slide 119 has another upstanding lug 119*b* struck therefrom and engageable with an abutment 126*a* depending from an arm 126 which is pivoted on a pin 127 carried by the chassis adjacent the take-up reel drive shaft 13, and which supports a rotatable idler wheel 128. When auxiliary slide 119 is displaced in the direction of arrow C from the position shown on FIG. 8, for example, to the position shown on FIG. 10, support arm 126 is turned counter-clockwise to engage idler wheel 128 with shaft 13. The idler wheel 128 is included in the drive assembly (not otherwise shown) for shaft 13, and such drive assembly is effective, when idler wheel 128 engages shaft 13, to turn the latter in the direction for winding tape on the take-up reel coupled with shaft 13**.

When the eject button (not shown) is actuated with support ring 21 in its operative position (FIG. 9), that is, with the tape wrapped about guide drum 1, for example, upon the completion of a recording or reproducing operation, slide 113 is displaced in the direction of the arrow A from the position shown on FIG. 9 and, through the engagement of lug **113*a* with abutment 124*a*, turns lever 122 in the counter-clockwise direction. By reason of such turning of lever 122, abutment 123*a* thereon acts on lug 106*b* of control lever 106 to turn the latter in the clockwise direction for removing cam follower roller 108 from recess 111 so that support ring 21 is then freed for rotation in the clockwise direction by motor 24 which is suitably energized in response to actuation of the eject button. Further, turning of control lever 106 in the clockwise direction for removing roller 108 from recess 111 is transmitted through lug 106*b* and extension 35*b* of support arm 35 to swing the latter clockwise for moving tape shifting pin 34 from its operative position (FIG. 9) towards its inoperative position (FIG. 8). Of course, as the rotation of ring 21 in the clockwise direction is continued, roller 108 rides on cam surface 112 to complete the return of pin 34 to tis inoperative position. The turning of lever 122 in the counter-clockwise direction also causes its abutment 123*a* to act against lug 119*a* on auciliary slide 119 for displacing the latter in the direction of the arrow C so that idler wheel 128 is thereby engaged with shaft 13 for driving the take-up reel. Thus, during the tape unloading operation, the tape slack resulting from the unwrapping of tape from guide drum 1 and the movement of tape shifting pin 34 back to its inoperative position is taken-up by the winding of the tape onto the rotated take-up reel. When the support ring 21 returns to its inactive or starting position at the completion of the tape unloading operation, the cassette holding device 3 becomes operative to eject the cassette from the operative position, as previously described with reference to FIGS. 2–5**.

The embodiment of the invention shown on FIGS. 8–10 further has a tape tension control assembly 129 which includes a tension arm 130 pivoted at one end on a pin 131 carried by chassis 2 and having an upstanding tape tensioning pin 132 at its free end. A spring 133 is connected at one end to an extension **130*a* of arm 130 and has its other end connected to a wire 133*a* which extends about post 105 to an adjustable anchor arm 134. During a recording or reproducing operation, spring 133 urges arm 130 in the clockwise direction so that its pin 132 acts laterally against, and thereby tensions the tape in the run $T_2$ thereof extending from the cassette 4 to the tape shifting pin 34 (FIG. 10). The extension 130*a* of arm 130 is further connected, as at 135, to one end of a brake band 136 which extends around supply reel drive shaft 12 and has its other end secured to an anchor 137 on the chassis. Thus, when arm 130 is turned in the clockwise direction by spring 133, for example, in response to a reduced tension in tape run $T_2$, brake band 136 is tightened against shaft 12 to increase the resistance to unwinding of tape from the associated supply reel. Conversely, if the tension in tape run $T_2$ exceeds the desired value, as determined by adjustment of anchor arm 134, the counter-clockwise turning of arm 130 against the force of spring 133 serves to loosen brake band 136** and thereby decrease the resistance to unwinding of the tape from the supply reel.

In order to deactivate the tape tension control assembly 129 except during recording and reproducing operations of the apparatus, tension arm 130 has a lateral extension **130*b*, and a T-shaped lever 138 having a head 139 and a stem 140 is pivotally mounted, intermediate the ends of its head 139, on a pin 141 located on the chassis between arm 130 and slide 114. A spring 142 is connected to the free end of stem 140 to urge lever 138 in the clockwise direction for engaging a lug 139*a* at one end of head 139 against an upstanding lug 114*a* on slide 114. An abutment 139*b* extends from the opposite end of head 139 into the path of travel of extension 130*b* of tension arm 130 to prevent clockwise turning of the latter by spring 133 when slide 114 and T-shaped lever 138 are in normal positions shown on FIGS. 8 and 9**.

The stem 140 of lever 138 has a node **140*a* engageable against a lug 119*c* struck from auxiliary slide 119 so that, when lever 138 is angularly displaced from the position of FIGS. 8 and 9 to the position of FIG. 10, auxiliary slide 119 is displaced in the direction of the arrow C for engaging idler wheel 128 with take-up reel drive shaft 13. The free end of stem 140 is further pivotally connected, as at 143, to one end of a connecting rod 144 which has its other end pivotally connected, as at 145, with a holding arm 146 which is pivotally mounted on pin 36 below tape shifting cam 35. The holding arm 146 has an upstanding abutment 146*a* which is engageable against extension 35*b* of arm 35** in the counter-clockwise direction.

During a tape loading operation as well as during a tape unloading and ejecting operation, slide 114, T-shaped lever 138 and holding arm 146 remain in the positions shown on FIGS. 8 and 9, so that abutment **139*b* of lever 138 blocks the previously described tension controlling action of arm 130 and holding arm 146 is disposed to avoid interference, by its abutment 146*a*, with movement of tape shifting pin 34 between its inoperative position (FIG. 8) and its operative position (FIG. 9**).

However, when the recording and reproducing button (not shown) is actuated for initiating a recording or reproducing operation of the apparatus, the displacement of slide 114 in the direction of arrow A causes counter-clockwise turning of lever 38 and displacement of auxiliary slide 119 in the direction of arrow C to the positions shown on FIGS. 10. Thus, idler wheel 128 is engaged with drive shaft 13 so that the take-up reel associated therewith is driven in the direction for winding tape thereon. Simultaneously, abutment **139*b* of lever 138 is moved away from extension 130*b* of tension arm 130 so that pin 132 can engage tape run $T_2$ under the influence of spring 133 for controlling the tape tension, as previously described. Further, the counter-clockwise turning of lever 138 causes similar turning of holding arm 146 by means of connecting rod 144 so that the abutment 146*a* of the holding arm acts against extension 35*b* of arm 35 for securely holding tape shifting pin 34 in its operative position during the recording or reproducing operation. Thus, changes in the tape tension cannot vary the extent of the periphery of guide drum 1 about which the tape is wrapped or the engagement of the tape with erasing head 16** during the recording or reproducing operations.

Figure 11:
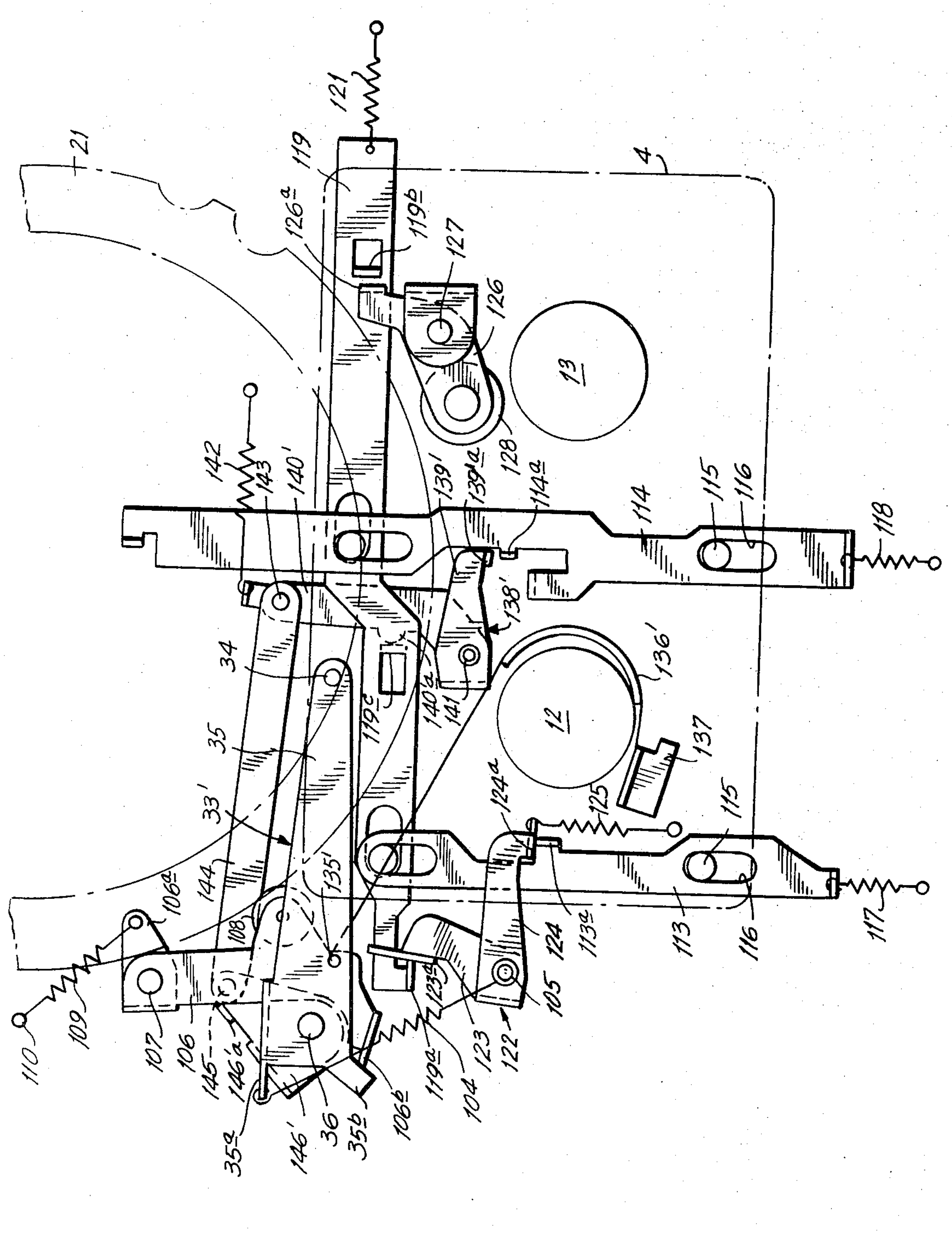
FIGS. 11 and 12 are views similar to FIGS. 8 and 9, but showing a tape shifting assembly and the actuating mechanisms therefor in accordance with another embodiment of the invention.
Figure 12:
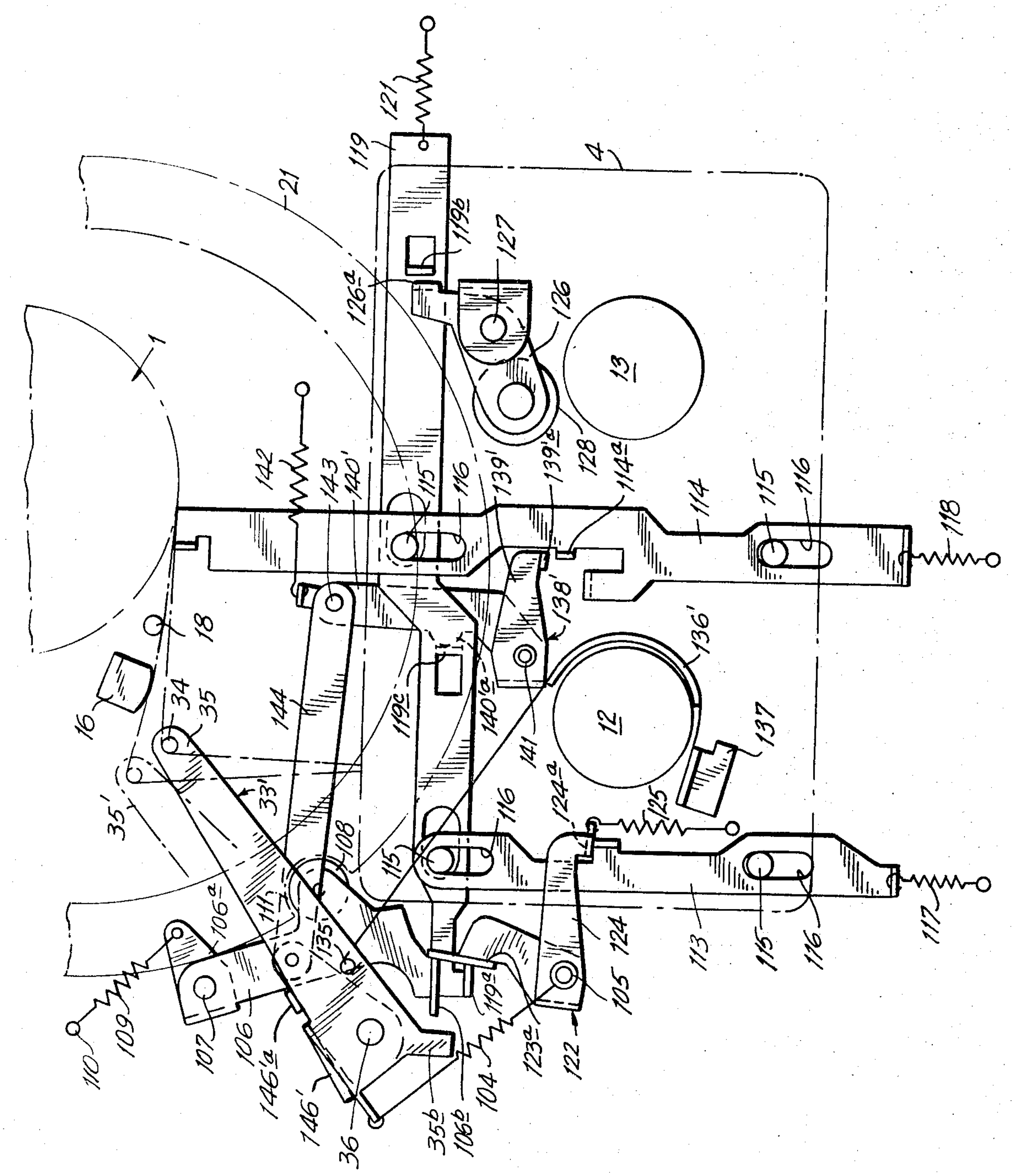

Referring now to FIGS. 11 and 12, it will be seen that, in the embodiment of the invention there illustrated, parts similar to those described above with reference to FIGS. 8–10 are identified either by the same reference numerals or by such reference numerals with primes appended thereto. The embodiment of FIGS. 11 and 12 is similar to that of FIGS. 8–10 and differs substantially from the latter only in that the tape shifting assembly 33' of FIGS. 11 and 12 functions to control the tension in the tape during recording and reproducing operations in addition to shifting the tape during loading and unloading operations so that the independent tape tension controlling assembly 129 of FIGS. 8–10 can be omitted.

More specifically, in the apparatus of FIGS. 11 and 12, the brake band 136' has one end connected to the anchor 137 and extends therefrom around supply reel drive shaft 12 to an attachment 135' on the tape shifting arm 35. The lever 138' pivoted at 141, in this case, is substantially L-shaped and has an arm 139' with a lug **139'*a* thereon urged against lug 114*a* on slide 114 by the action of spring 142 on the other arm 140'. As before, a node 140'*a* on arm 140' is engageable against the lug 119c on slide 119, and arm 140' is connected through rod 144 to a holding arm 146' which is pivoted on pin 36 below tape shifting arm 35**.

The holding arm 146' has an upstanding abutment **146'*a* thereon which is engageable with tape shifting arm 35 at a location along the latter between pivot pin 36 and tape shifting pin 34 (FIG. 12) for limiting the turning of arm 35 in the counter-clockwise direction, that is, in the direction in which arm 35 is urged by spring 104. The length of brake band 136' is selected so that, when support ring 21 is in its starting or inactive position (FIG. 11) for disposing tape shifting pin 34 in its inoperative position, the brake band will be loose or slack around drive shaft 12** and, therefore, will not apply a braking force to the latter.

When support ring 21 is moved to its operative position at the completion of a tape loading operation (FIG. 12), the counter-clockwise turning of tape shifting arm 35 by spring 104 is limited by abutment **146'*a* and the engagement of cam follower roller 108 in recess 111 permits the action of spring 109 to move lug 106*b* on control lever 106 away from the extension 35*b* of arm 35. When the position of arm 35 is determined by its engagement with abutment 146'*a* on holding arm 146', as on FIG. 12, the brake band 136' is still loosely engaged about drive shaft 12 so that a braking force is not applied to the latter. However, when slide 114 is displaced for a recording or reproducing operation, for example, to the position shown on FIG. 10, lever 138' is turned similarly to lever 138 on FIG. 10 with the result that holding arm 146' is turned in the counter-clockwise direction from the position shown on FIG. 12 for releasing abutment 146'*a* from arm 35. Upon the release of abutment 146'*a* from arm 35, spring 104 can turn arm 35 further in the counter-clockwise direction, for example, to the position indicated in broken lines at 35' on FIG. 12, with the result that the tape between guide drum 1 and cassette 4 is now tensioned and applied against erasing head 16, and further with the result that brake band 136' is now tensioned to apply a braking force to supply reel drive shaft 12. During the recording or reproducing operation, as arm 35 is angularly displaced about its pivot 36 in response to changes in the tension in the tape engaged by pin 34 on arm 35, the tension in brake band 136'** is correspondingly varied so as to maintain a substantially constant tape tension.

Apart from the manner in which the tape tension is controlled, as described above, it will be apparent that the operations of the embodiment of the invention shown on FIGS. 11 and 12 are the same as those of the apparatus described with reference to FIGS. 8–10.

Although illustrative embodiments of the invention have been described in detail herein with reference to the accompanying drawings, it will be understood that the invention is not limited to those precise embodiments, and that various changes and modifications may be effected therein by one skilled in the art without departing from the scope or spirit of the invention as defined in the appended claims.

What is claimed is:

1. In a magnetic recording and/or reproducing apparatus that includes a cylindrical tape guide drum with at least one rotary magnetic head moved in a circular path substantially coinciding with the periphery of said drum, tape supply means containing a magnetic tape, a capstan spaced from said guide drum, and holder means spaced from said guide drum for receiving and positioning said tape supply means; a tape loading and unloading device comprising support means rotatable around said drum between inactive and operative positions in ar arcuate path that extends adjacent said capstan and said holder means, tape engaging means including a pinch roller mounted on said support means and being movable with the latter in said arcuate path for engaging the tape contained by the tape supply means positioned on said holder means with said support means in said inactive position and for withdrawing a progressively extended loop of said tape from said supply means and wrapping one side of the extended tape loop about at least a portion of said periphery of the guide drum in response to movement of said support means from said inactive position to said operative position at which said pinch roller is located within said tape loop adjacent said capstan with the tape of said loop therebetween, cam means on said rotatable support means, and tape shifting means controllable by said cam means for engaging the tape contained by the tape supply means positioned on said holder means with said support means in said inactive position and for shifting said one side of the tape loop between said guide drum and said tape supply means in the direction increasing the extent of said portion of the guide drum periphery about which the tape is wrapped in response to movement of said support means to said operative position.

2. A magnetic recording and/or reproducing apparatus according to claim 1; further comprising locking means engageable with tape supply means in said holder means for preventing the removal of the tape supply means therefrom, and actuating means for said locking means controllable by said cam means to permit release of said locking means from tape supply means in said holder means only when said support means is in said inactive position thereof.

3. A magnetic recording and/or reproducing apparatus according to claim 2; in which said tape supply means includes a cassette housing containing at least one reel on which the tape is wound and having an opening through which the tape can be withdrawn, said holder means includes a table resiliently urged to a raised position for receiving said cassette housing and being movable with the latter to a lowered operative position at which said tape engaging means and said tape shifting means extend into said opening of the cassette housing for engaging the tape therein with said support means in said inactive position, and said locking means are engageable over said cassette housing on said table in said lowered operative position of the latter for retaining the table in said operative position thereof and for securing the cassette housing thereon.

4. A magnetic recording and/or reproducing apparatus according to claim 3; in which said cassette locking means includes locking arms pivoted at opposite sides of said table for simultaneous movement between inner locking positions and outer released positions, and rollers carried by said locking arms and rolling on side surfaces of said table during movement of the latter between its raised position and its lowered operative position with said locking arms in said outer released positions; and in which said rollers engage on top of said cassette housing when said locking arms are moved to said inner locking positions with said table in said lowered operative position thereof.

5. A magnetic recording and/or reproducing apparatus according to claim 4; in which said support means includes a rotatable ring, said cam means includes a recess in the periphery of said ring and a cam surface extending from said recess along said periphery of the ring and progressively increasing in its radial distance from the rotational center of said ring in the direction opposed to the rotational movement of the latter from its inactive position to its operative position; and in which said actuating means includes a pivoted lever carrying a cam follower roller engageable in said recess when said ring is in said inactive position thereof, and connecting means between said lever and said locking arms permitting removal of said cam follower roller from said recess only when said table is in said lowered operative position to allow said locking arms to move to said locking positions and securing said locking arms in said locking positions when said cam follower roller engages said cam surface.

6. A magnetic recording and/or reproducing apparatus according to claim 5; in which a spring urges said lever carrying the cam follower roller in the direction for removing the latter from said recess, and means are provided for urging said locking arms to said released outer positions and thereby engaging said cam follower roller in said recess when said ring is in said inactive position thereof.

7. A magnetic recording and/or reproducing apparatus according to claim 5; in which said connecting means includes first and second, relatively turnable connecting levers which are respectively engageable by said lever carrying the cam follower roller and engageable with one of said locking arms, and spring means connecting said first and second connecting levers.

8. A magnetic recording and/or reproducing apparatus according to claim 5; in which said connecting means includes a connecting lever engageable at one end with one of said locking arms, and a bearing plate adjustably mounted on the other end portion of said connecting lever and being engageable by said lever carrying the cam follower roller.

9. A magnetic recording and/or reproducing apparatus according to claim 4; further comprising a motor for turning said support means from said inactive position to said operative position of the latter, and switch means for controlling the operation of said motor and being actuable by one of said locking arms in said locking position of the latter.

10. A magnetic recording and/or reproducing apparatus according to claim 1; in which said tape shifting means includes a pivoted tape shifting arm carrying a tape shifting pin and being movable between an inoperative position where said tape shifting pin engages the tape within said tape supply means and an operative position where said tape shifting pin shifts said one side of the tape loop between said guide drum and said tape supply means, spring means urging said tape shifting arm to said operative position, and a control lever carrying a cam follower roller which engages said cam means and controls the positioning of said tape shifting arm in dependence on the rotational positioning of said support means.

11. A magnetic recording and/or reproducing apparatus according to claim 10; in which said support means includes a rotatable ring; and in which said cam means includes a recess located in the periphery of said ring for receiving said cam follower roller when said ring is in said operative position thereof and thereby causing said control lever to permit movement of said tape shifting arm to its operative position, and a cam surface extending along said periphery of the ring to said recess and decreasing in its radial distance from the rotational center of said ring in the rotational direction opposed to that for movement of said ring from said inactive position to said operative position so that said tape shifting arm is gradually moved away from its inoperative position during the rotational movement of said ring from said inactive position toward said operative position of the ring.

12. A magnetic recording and/or reproducing apparatus according to claim 10; in which said tape supply means includes supply and take-up reels on which the tape is wound; and further comprising supply and take-up reel drive shafts engages with said supply and take-up reels, respectively, when said tape supply means is positioned by said holder means, means for driving said take-up reel drive shaft during recording and reproducing operations of the apparatus, braking means engageable with said supply reel drive shaft, and brake control means controlling the braking effect of said braking means in accordance with the tension in the tape between said guide drum and said supply during said recording and reproducing operations so as to maintain a substantially constant tape tension.

13. A magnetic recording and/or reproducing apparatus according to claim 12; in which said braking means includes a brake band anchored at one end and extending therefrom around said supply reel drive shaft, and said brake control means includes a pivoted tension control arm having the other end of said brake band connected thereto, a tape tensioning pin on said tension control arm, spring means urging said tension control arm in the direction to tension said brake band and to press said tape tensioning pin against the tape between said tape shifting pin, in the operative position of the latter, and said supply reel, blocking means normally active to block the movement of said tape tensioning arm by said spring means urging the latter, and means for deactivating said blocking means during said recording and reproducing operations.

14. A magnetic recording and/or reproducing apparatus according to claim 13; in which holding means is connected with said blocking means and is operative, upon said deactivating of the latter, to hold said tape shifting arm in said operative position thereof.

15. A magnetic recording and/or reproducing apparatus according to claim 12; in which said braking means includes a brake band anchored at one end and extending therefrom around said supply reel drive shaft, and said brake control means includes a connection between the other end of said brake band and said tape shifting arm for tensioning said brake band when said tape shifting arm is adjacent said operative position of the latter.

16. A magnetic recording and/or reproducing apparatus according to claim 15; in which said support means includes a rotatable ring, said cam means includes a recess located in the periphery of said ring for receiving said cam follower roller when said ring is in said operative position thereof, holding means limits the swinging of said tape shifting arm by said spring means urging the same when said cam follower roller is received in said recess, and means disengages said holding means from said tape shifting arm during said recording and reproducing operations.

17. In a magnetic recording and/or reproducing apparatus that includes a cylindrical tape guide drum with at least one rotary magnetic head moved in a circular path substantially coinciding with the periphery of said drum, tape supply means containing a magnetic tape, a capstan spaced from said guide drum, and holder means spaced from said guide drum for receiving and positioning said tape supply means; a tape loading and unloading device comprising support means rotatable around said drum between inactive and operative positions in ar arcuate path that extends adjacent said capstand and said holder means, tape engaging means including a pinch roller mounted on said support means and being movable with the latter in said arcuate path for engaging the tape contained by the tape supply means positioned on said holder means with said support means in said inactive position and for withdrawing a progressively extended loop of said tape from said supply means and wrapping one side of the extended tape loop about at least a portion of said periphery of the guide drum in response to movement of said support means from said inactive position to said operative position at which said pinch roller is located within said tape loop adjacent said capstan with the tape of said loop therebetween, cam means on said rotatable support means, locking means engageable with tape supply means in said holder means for preventing the removal of the tape supply means therefrom, and actuating means for said locking means controllable by said cam means to permit release of said locking means from said tape supply means in said holder means only when said support means is in said inactive position thereof.

18. A magnetic recording and/or reproducing apparatus according to claim 17; in which said tape supply means includes a cassette housing containing at least one reel on which the tape is wound and having an opening through which the tape can be withdrawn, said holder means includes a table resiliently urged to a raised position for receiving said cassette housing and being movable with the latter to a lowered operative position at which said tape engaging means and said tape shifting means extend into said opening of the cassette housing for engaging the tape therein with said support means in said inactive position, and said locking means are engageable over said cassette housing on said table in said lowered operative position of the latter for retaining the table in said operative position thereof and for securing the cassette housing thereon.

19. A magnetic recording and/or reproducing apparatus according to claim 18; in which said cassette locking means includes locking arms pivoted at opposite sides of said table for simultaneous movement between inner locking positions and outer released positions, and rollers carried by said locking arms and rolling on side surfaces of said table during movement of the latter between its raised position and its lowered operative position with said locking arms in said outer released positions; and in which said rollers engage on top of said cassette housing when said locking arms are moved to said inner locking positions with said table in said lowered operative position thereof.

20. A magnetic recording and/or reproducing apparatus according to claim 19; in which said support means includes a rotatable ring, said cam means includes a recess in the periphery of said ring and a cam surface extending from said recess along said periphery of the ring and progressively increasing in its radial distance from the rotational center of said ring in the direction opposed to the rotational movement of the latter from its inactive position to its operative position; and in which said actuating means includes a pivoted lever carrying a cam follower roller engageable in said recess when said ring is in said inactive position thereof, and connecting means between said lever and said locking arms permitting removal of said cam follower roller from said recess only when said table is in said lowered operative position to allow said locking arms to move to said locking positions and securing said locking arms in said locking positions when said cam follower roller engages said cam surface.

* * * * *